(12) United States Patent
Hollins et al.

(10) Patent No.: US 6,317,486 B1
(45) Date of Patent: Nov. 13, 2001

(54) NATURAL LANGUAGE COLLOQUY SYSTEM SIMULATING KNOWN PERSONALITY ACTIVATED BY TELEPHONE CARD

(76) Inventors: Jack Hollins, Central Medical Plaza, 1760 Nicholasville Rd., Suite 203, Lexington, KY (US) 40503-1424; William K. Back, 919 Christopher Cir., Ada, OH (US) 45810

( * ) Notice: Subject to any disclaimer, the term of this patent is extended or adjusted under 35 U.S.C. 154(b) by 0 days.

(21) Appl. No.: 08/922,981

(22) Filed: Sep. 2, 1997

(51) Int. Cl.[7] .......................... H04M 1/64; H04M 11/00; G06F 17/27
(52) U.S. Cl. .................. 379/88.23; 379/67.1; 379/88.17; 379/88.18; 379/93.13; 704/2; 704/9
(58) Field of Search .............................. 379/67.1, 68, 71, 379/76, 88.01, 88.03, 88.16, 88.17, 88.18, 88.23, 91.01, 88.11, 144, 93.13; 704/2, 3, 9; 705/25, 26, 27, 28

(56) References Cited

U.S. PATENT DOCUMENTS

| | | | |
|---|---|---|---|
| 5,146,487 | * | 9/1992 | Bergsman et al. ..................... 379/67 |
| 5,251,251 | * | 10/1993 | Barber et al. .......................... 379/67 |
| 5,426,594 | * | 6/1995 | Wright et al. ..................... 364/514 R |
| 5,513,117 | * | 4/1996 | Small .................................... 364/479 |
| 5,592,537 | * | 1/1997 | Moen .................................... 379/67 |
| 5,787,151 | * | 7/1998 | Nakatsu et al. ........................ 379/67 |

* cited by examiner

Primary Examiner—Allan Hoosain
(74) Attorney, Agent, or Firm—Ostrolenk, Faber, Gerb & Soffen, LLP

(57) ABSTRACT

An artificial intelligence system includes a telephone interface coupled to a telephone network which is capable of connecting with a caller, a debit card processing unit coupled to the telephone interface for verifying that the caller has one of a plurality of predetermined telephone debit cards which are capable of accessing only the one or more telephone numbers assigned to the telephone interface, and an artificial intelligence (A/I) engine including a natural language processor, the A/I engine being adaptable upon instruction by the caller to engage in colloquy with the caller in a voice of one of a plurality of known personalities.

12 Claims, 3 Drawing Sheets

NATURAL LANGUAGE COLLOQUY SYSTEM SIMULATING KNOWN PERSONALITY ACTIVATED BY TELEPHONE CARD

BACKGROUND OF THE INVENTION

1. Field of the Invention

The present invention relates to an artificial intelligence (A/I) system which simulates the voices of known personalities and characters for colloquy with telephone callers and, more particularly, to an artificial intelligence system which is activated by a telephone debit card.

2. Related Art

Artificial intelligence systems which are capable of simulating dialogue with a user are known. For example, U.S. Pat. No. 5,615,296 to Stanford discloses a continuous speech recognition and voice response system providing natural sounding and interactive speech driven dialogue from a data processing system. That system provides for the concatenation of words into phrases and sentences so that the recognition and simulation of natural language is improved. The system uses speaker-independent, continuous-speech to initiate the use of audio files and employs high-speed context switching to modify the active vocabulary of the system. The entire disclosure of U.S. Pat. No. 5,615,296 is hereby incorporated by reference.

Voice animation systems which are capable of computer generated speech which sounds like a particular person are known. For example, U.S. Pat. No. 5,278,943 to Gasper discloses a voice animation system which decomposes pre-recorded samples of actual speech into basic segments to derive speech patterns of a particular speaker. The samples are used to provide parameters and coefficients in a text-to-speech synthesizer to artificially synthesize human quality speech with unlimited vocabulary in the voice of the person who provided the pre-recorded samples. The pre-recorded speech samples are further processed to add desired inflection and other auditory effects to create high-quality animated or artificial voices. The entire disclosure of U.S. Pat. No. 5,278,943 is hereby incorporated by reference.

Telephone debit cards are also known. For example, U.S. Pat. No. 5,511,114 to Stimson discloses a pre-paid calling card system which enables customers to access a telephone network and obtain long distance telephone service. The management and processing of the system is effected by a host computer which is connectable to the telephone network. The host computer includes a data base for storing security numbers associated with authorized calling cards. The host computer permits one or more customers to access the telephone network using the authorized calling cards. The entire disclosure of U.S. Pat. No. 5,511,114 is hereby incorporated by reference.

Unfortunately, the prior art does not disclose a system in which a telephone debit card provides access to only one set of predetermined telephone numbers such that only the predetermined telephone numbers may be called using the debit card.

Further, the prior art does not teach or suggest an A/I system coupled to a telephone network for which a caller, desirous of engaging in dialog with the A/I system, may select one personality among a plurality of known personalities for effecting the voice quality, inflection, colloquy, etc. of a natural language processor of the A/I system.

Accordingly, there is a need in the art for an improved A/I system which is coupled to a telephone network and which may be activated using a telephone debit card, to provide entertainment to children and adults in the form of simulated conversations with well known personalities and/or characters.

SUMMARY OF THE INVENTION

In order to overcome the disadvantages of the prior art, the A/I system of the present invention includes a telephone interface coupled to a telephone network which is capable of connecting with a plurality of callers, a debit card processing unit coupled to the telephone interface for verifying that the callers have one of a plurality of predetermined telephone debit cards which are capable of accessing only the one or more telephone numbers assigned to the telephone interface, and an artificial intelligence (A/I) engine including a natural language processor, the A/I engine being adaptable upon instruction by the callers to engage in colloquy with the caller in a voice of one of a plurality of known personalities.

Other features and advantages of the present invention will become apparent from the following description of the invention which refers to the accompanying drawings.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE INVENTION

Figure 1:
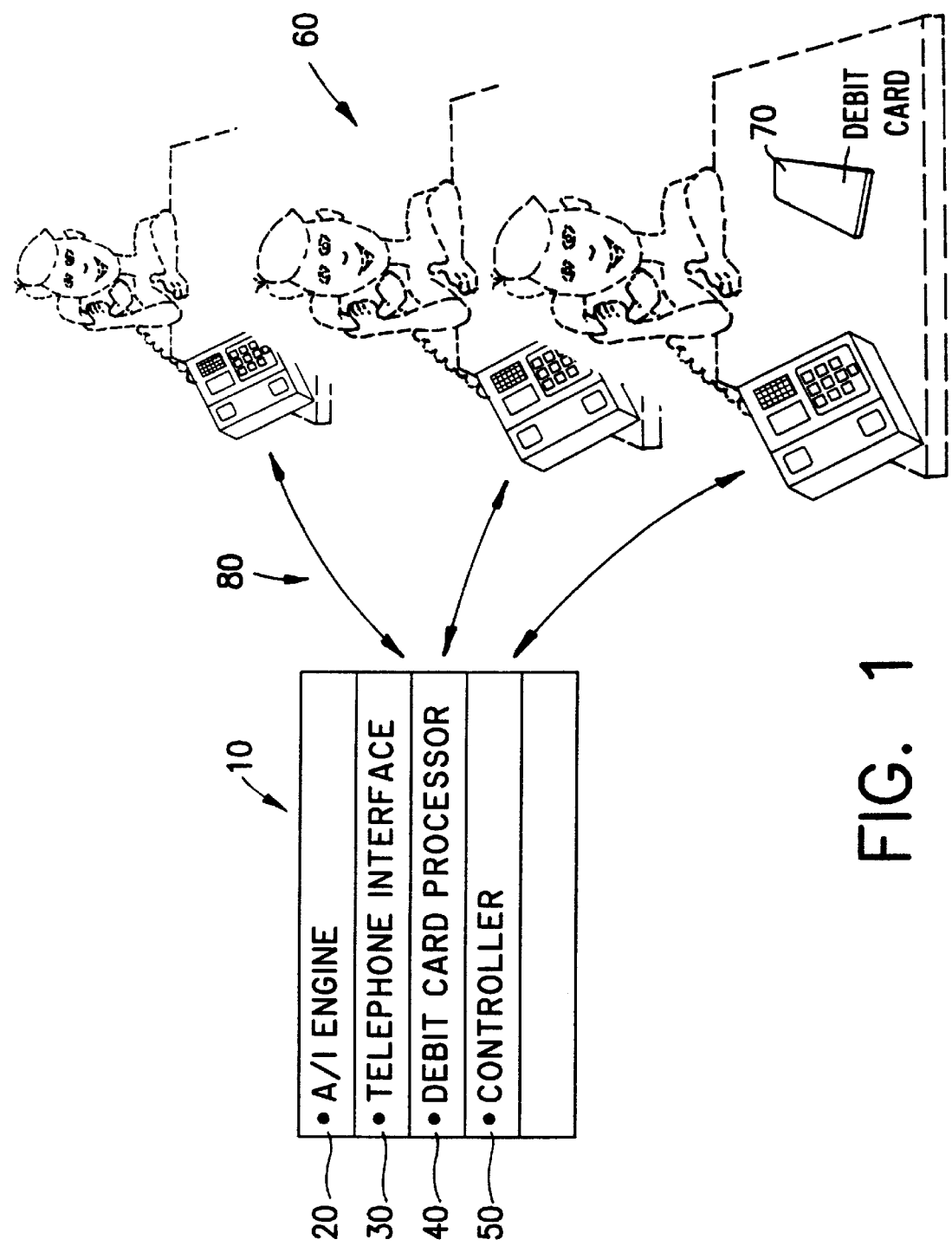
FIG. 1 is a schematic diagram showing the interaction of users with the A/I system of the present invention.

Referring now to the drawings wherein like numerals indicate like elements, there is shown in FIG. 1 an artificial intelligence (A/I) system 10 which includes an A/I engine 20, a telephone interface 30, a debit card processor 40, and a controller 50. The A/I system is capable of connecting to a telephone network 80 through the telephone interface 30 such that one or more of a plurality of callers 60 may interface with the A/I system 10.

Each of the callers 60 must have a debit card 70 to gain access to the A/I system 10. In other words, only predetermined debit cards 70 may be used to access the A/I system 10 as opposed to prior art debit cards which may be used to access any telephone number of the telephone network 80. Moreover, the debit cards 70 are only capable of accessing a predetermined set of telephone numbers, which telephone numbers are assigned to the A/I system 10. Consequently, any caller 60 in possession of the debit card 70 will only be able to access the A/I system 10 and no other party.

In accordance with the invention, the A/I engine 20 includes a natural language processor, a voice recognition system, and a voice synthesizer. The voice synthesizer is capable of being adapted to produce a voice that sounds substantially similar to a plurality of known personalities, for example, Big Bird, Santa Claus, Donald Duck, and the like. The controller 50 is linked to the telephone interface 30 such that the caller 60 may effect the selection of one of the plurality of known personalities to which the voice synthesizer is to adapt.

The A/I system 10 is capable of engaging in colloquy with one or more of the callers 60 and will maintain a dialogue with each of the callers 60 until the caller 60 wishes to terminate the call or there are no longer sufficient funds or time remaining on that caller's debit card 70.

It is noted that the telephone interface 30 must be capable of multiplexing the input from the plurality of callers 60 and the output from the A/I engine 20 in order to minimize the hardware required and reduce the costs associated with servicing a plurality of callers 60.

Figure 2A:
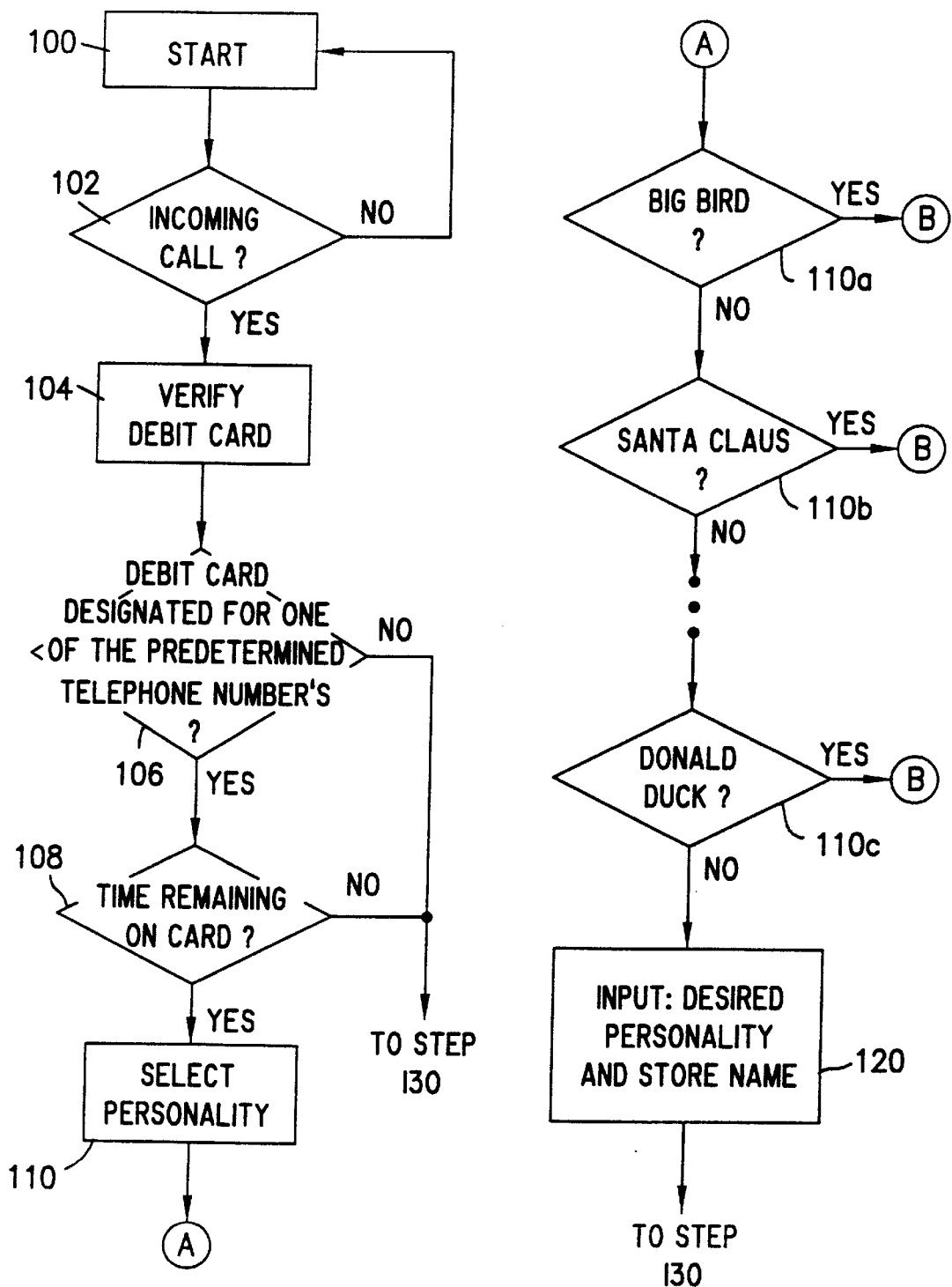
FIGS. 2a and 2b are a diagram of the control sequence and operational flow of the A/I system of FIG. 1.
Figure 2B:
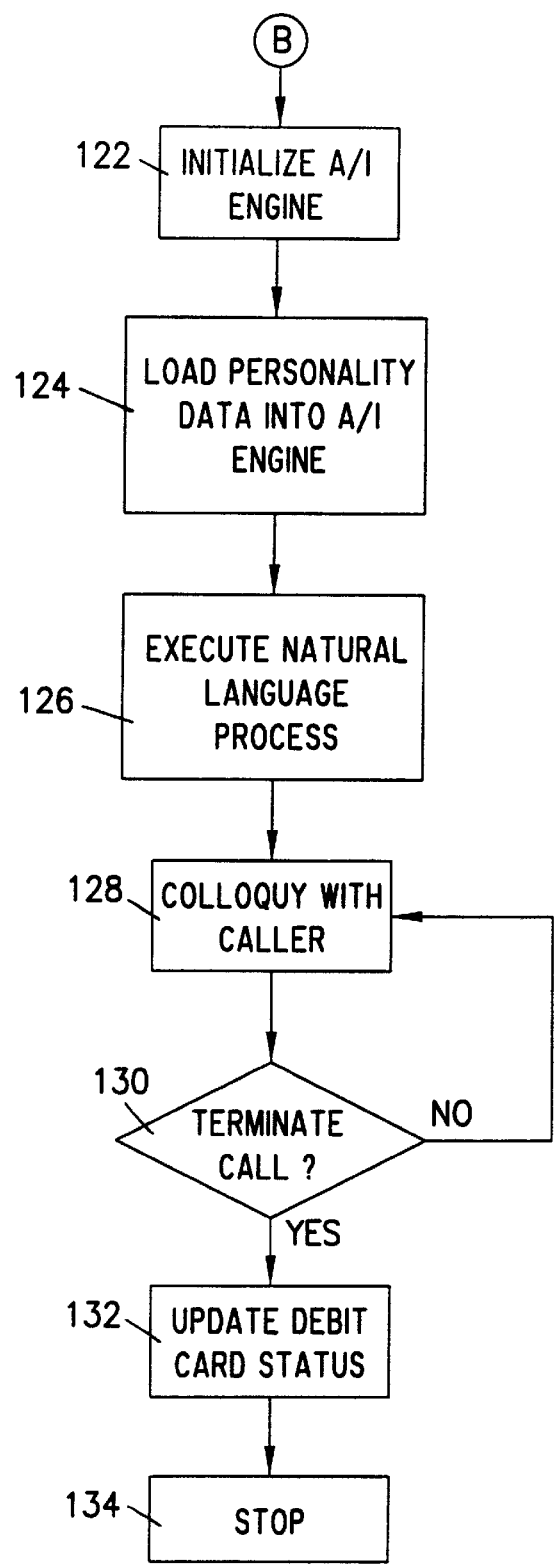

With reference to FIGS. 2a and 2b, the operation of the preferred embodiment of the present invention is described in terms of the control sequencing and operational flow of the system 10. The operation of the system starts at step 100 and at step 102 the controller 50 queries the telephone interface 30 as to whether an incoming call has been received. If a call has not been received then the process flow loops back to step 100 until a call is received.

At step 104 the debit card processor 40 may query the caller 60 for an access number of his or her debit card 70. It is noted that debit cards 70 may include a magnetic strip or other storage media which includes all necessary security and access information, which information may be automatically extracted from the debit card 70 through, for example, a card reader (not shown), or from a PIN keyed-in by the caller and the like.

In any event, the debit card processor 40 verifies that the caller 60 has been issued at least one of a plurality of predetermined debit cards 70 which are specifically designated for use with the A/I system 10 (step 106). If the debit card 70 is not designated for one of the predetermined telephone numbers associated with the A/I system 10 then the controller 50 and debit card processor 40 shift process control to step 130 where a determination is made as to whether to terminate the call. Prior to terminating the call, the A/I system 10 may loop to step 128 and enter into a dialogue with the caller 60 to inform the caller 60 as to how to obtain a debit card 70 suitable for accessing the A/I system 10.

Turning back to step 106, if the caller 60 is in possession of at least one of the predetermined debit cards 70 for access to the A/I system 10, then at step 108 the debit card processor 40 makes a determination as to whether there is sufficient time and/or funds available on the debit card 70 to warrant access to the A/I system 10. If the caller 60 does not have sufficient time and/or funds on his or her debit card 70, then process flow moves to step 130 where the call may be terminated. Assuming, however, that the caller 60 is in possession of a debit card 70 having sufficient time and/or funds thereon, process flow proceeds to step 110 where the caller 60 may select one of the known personalities which the A/I system 10 is to adopt during colloquy with the caller 60.

At steps 110a–110c, the controller 50 and A/I engine 20 may query the caller 60 as to which one of the predetermined known personalities the caller 60 wishes to select. A sequential series of questions may be presented to the caller 60, for example, (i) Do you want to speak with Big Bird? (Step 110a); (ii) Do you want to speak with Santa Claus? (Step 110b); or (iii) Do you want to speak with Donald Duck? (Step 110c). If the caller's answer to any one of the series of questions is in the affirmative, then the controller 50 and A/I engine 20 move to step 122. If, however, the caller's answer to the questions are not in the affirmative, then the control process moves to step 120 where the A/I engine 20 and controller 50 may query the caller 60 as to which specific known personality the caller 60 wishes to dialogue with. The user 60 may then present the A/I system 10 with the name of a new known personality, which name the controller 50 stores in a memory (not shown). In addition, the controller 50 is capable of tallying the number of callers 60 which identify the same new known personality such that new known personalities may be added to the set of predetermined known personalities available to the caller 60 for selection. Thus, once the tally (i.e., the number of callers 60 which have identified a particular new known personality) has reached a predetermined threshold, then the owners of the A/I system 10 may be prompted to add the new known personality to the list of known personalities available to the callers 60.

Turning back to step 122, once a known personality has been selected by the caller 60, the A/I engine 20 is initialized, i.e. programmed with the characteristics necessary to provide a dialogue in the voice of the selected known personality (step 124). More particularly, stored data representing the vocal characteristics of the known personality are retrieved from a memory and input to the voice synthesizer of the A/I engine 20. Thus, the voice synthesizer of the A/I engine 20 enables the A/I system 10 to execute a natural language process (step 126) and engage in a dialogue with the caller 60 (step 128).

As is known in the natural language processing art, the A/I engine 20 executes an artificial intelligence program which parses the speech of the caller 60 into recognizable patterns and formulates responses to the statements made by the caller 60. As is known in the art, the artificial intelligence program may be designed to be specifically suited toward a particular purpose. For the purposes of the present invention, the artificial intelligence program is preferably directed towards interacting with children and, therefore, is designed to provide suitable and enjoyable simulated dialogue with the children 60.

During the time that the caller 60 is engaging in dialogue with the A/I system 10, the debit card processor 40 monitors time and/or funds expended during the dialogue. If the amount of funds and/or time available on the debit card 70 of a particular caller 60 falls below a predetermined value, then the A/I system 10 may terminate the call (step 130). Once the call is terminated, the debit card 70 may once again be updated (step 132).

The program sequence stops at step 134 for a particular caller 60 but the A/I system 10 is capable of multiplexing among a plurality of callers 60 and, therefore, may simultaneously execute any of the processor steps discussed hereinabove.

It is noted that the process control discussed with reference to FIGS. 2a and 2b is only one program configuration of many configurations which may be implemented. Indeed, one skilled in the art may readily modify the process control program in light of the above teaching, for example, the caller 60 may select to speak with more than one known personality and therefore may select more than one known personality at step 110. Further, the debit card processor 40 may be programmed to provide the caller 60 with the opportunity to purchase more time on his or her debit card 70, preferably first requesting that the caller 60 put his or her parent or guardian on the phone to purchase the additional time.

It is apparent that the debit card 70 would make an attractive gift for a child or the parent of a child and the card 70 may be particularly suited for being provided in combination with a greeting card. Such a telephone debit card and greeting card combination is discussed in detail in U.S. Pat. No. 5,629,977 to Fonseca, the entire disclosure of which is hereby incorporated by reference.

Although not shown, it should be evident that various voices which may be played in the course of operating the present invention may constitute proprietary intellectual property of third parties. Accordingly, the invention also requires obtaining one or more licenses to use the proprietary character voices. To this end, the invention may also include as part of its computer-based system a facility for maintaining a tally of the length of time during which the various proprietary voices have been used in conversations with the callers 60. A computer software facility can easily be implemented to convert the measured time to royalty payments that need to be remitted to the owners of the corresponding proprietary rights.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An artificial intelligence system, comprising:
   a telephone interface coupled to a telephone network and being capable of connecting with a caller, the telephone interface having one or more telephone numbers assigned thereto;
   a debit card processing unit coupled to the telephone interface for verifying that the caller has one of a plurality of predetermined telephone debit cards which are capable of accessing the one or more telephone numbers assigned to the telephone interface; and
   an artificial intelligence (A/I) engine including a natural language processor, the A/I engine being adaptable upon instruction by the caller selecting one of a plurality of known personalities to engage in colloquy with the caller in the voice of said one of the plurality of known personalities.

2. The artificial intelligence system of claim 1, wherein the plurality of known personalities are selected to appeal to children.

3. The artificial intelligence system of claim 1, wherein the artificial intelligence system engine includes a facility for storing and keeping a tally of the names of known personalities which are not among the plurality of known personalities for selection by the caller such that the known personalities for which the names have been stored may be added to the plurality of known personalities available for colloquy when the tally reaches a predetermined level.

4. The artificial intelligence system of claim 1, in which the telephone debit cards are capable of accessing only the one or more telephone numbers assigned to the telephone interface.

5. A entertainment process for entertaining individuals, the process comprising:
   providing a telephone interface coupled to a telephone network and being capable of connecting with a caller, the telephone interface having one or more telephone numbers assigned thereto;
   providing a debit card processing unit coupled to the telephone interface for verifying that the caller has one of a plurality of predetermined telephone debit cards which are capable of accessing the one or more telephone numbers assigned to the telephone interface; and
   providing an artificial intelligence (A/I) engine including a natural language processor, the A/I engine being adaptable upon instruction by the caller selecting one of a plurality of known personalities to engage in colloquy with the caller in the voice of said one of the plurality of known personalities.

6. The process of claim 5, including storing and keeping a tally of the names of known personalities which are not among the plurality of known personalities for selection by the caller such that the known personalities for which the names have been stored may be added to the plurality of known personalities available for colloquy when the tally reaches a predetermined level.

7. The process of claim 5, including monitoring a plurality of calls from a plurality of callers.

8. The process of claim 7, including verifying the calls against a database containing a list of approved debit cards.

9. The method of claim 8, including monitoring the time remaining on the debit cards used to access the telephone interface.

10. The process of claim 5, wherein the known personalities are selected from a group including Big Bird, Santa Claus, Donald Duck, and Mickey Mouse.

11. The process of claim 5, including loading personality data into the artificial intelligence engine.

12. The process of claim 5, including maintaining data files showing cumulative time periods during which voices of the different ones of the known personalities have been used in the telephone colloquy with callers.

* * * * *